United States Patent
Bae

(10) Patent No.: US 8,234,352 B2
(45) Date of Patent: Jul. 31, 2012

(54) METHOD OF SEARCHING FOR IMAGE FORMING APPARATUSES BY USING SERVER, AND HOST APPARATUS AND SYSTEM FOR PERFORMING THE METHOD

(75) Inventor: Sung-hoon Bae, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 129 days.

(21) Appl. No.: 12/509,590

(22) Filed: Jul. 27, 2009

(65) Prior Publication Data

US 2010/0100586 A1   Apr. 22, 2010

(30) Foreign Application Priority Data

Oct. 17, 2008   (KR) .................. 10-2008-0102149

(51) Int. Cl.
*G06F 15/16* (2006.01)

(52) U.S. Cl. ........................................ 709/218; 709/226

(58) Field of Classification Search ................ 358/1.15; 709/218

See application file for complete search history.

(56) References Cited

U.S. PATENT DOCUMENTS

| | | | |
|---|---|---|---|
| 5,692,111 A * | 11/1997 | Marbry et al. | 358/1.15 |
| 6,452,692 B1 * | 9/2002 | Yacoub | 358/1.15 |
| 2003/0090694 A1 * | 5/2003 | Kennedy et al. | 358/1.13 |
| 2004/0008366 A1 * | 1/2004 | Ferlitsch | 358/1.15 |
| 2005/0111030 A1 * | 5/2005 | Berkema et al. | 358/1.15 |
| 2005/0114520 A1 * | 5/2005 | White et al. | 709/228 |
| 2007/0127069 A1 * | 6/2007 | Steele et al. | 358/1.16 |
| 2007/0271363 A1 * | 11/2007 | Ross et al. | 709/223 |
| 2008/0079975 A1 * | 4/2008 | Ferlitsch et al. | 358/1.13 |

* cited by examiner

*Primary Examiner* — Christopher Biagini
(74) *Attorney, Agent, or Firm* — Staas & Halsey LLP

(57) ABSTRACT

A method of searching for peripheral image forming apparatuses by using a server that is connected to a host apparatus in which one or more printer application programs (PAP) are installed. The method includes: if a printer management program (PMP) search method is selected as a search method, invoking a PMP installed in the server; receiving from the PMP a search list including one or more image forming apparatuses connectable to the host apparatus; and selecting an image forming apparatus from the search list and connecting the selected image forming apparatus to the host apparatus.

13 Claims, 5 Drawing Sheets

FIG. 2

- PRINTER MANAGEMENT PROGRAM SEARCH METHOD (200)
- PRINTER APPLICATION PROGRAM SEARCH METHOD (210)
- MANUAL SEARCH METHOD (220)

FIG. 3A

Detected Printer List

| No | Model Name | Connection | IP Address | Mac Address | IP Assign Method | Status | Detection | Supporting Printer Application Program Program |
|----|------------|------------|------------|-------------|------------------|--------|-----------|------------------------------------------------|
| 1 | SCX-5530 | Network | "168.219.12.2 | 0000F0A01234 | STATIC | Idle | "Broadcast | SETIP, PSU, Print, Port Status Monitor, Direct Print, Scan to Email, NetScan, Scan to FTP, Scan to SMB, PC Fax, TWAIN |
| 2 | ML-1631 | Network | "168.219.12.3 | 0000F0A01235 | STATIC | Printing.... | "Broadcast | SETIP, PSU, Print, Port Status Monitor, Direct Print |
| 3 | ML-3400 | Network | "168.219.21.234 | 0000F0A01236 | DHCP | Idle | "Multicast | SETIP, PSU, Print, Port Status Monitor, Direct Print |
| 4 | CLX-6200 | Network | "169.254.10.23 | 0000F0A01237 | AUTO IP | Idle | PMP | SETIP, PSU, Print, Port Status Monitor, Direct Print, Scan to Email, NetScan, Scan to FTP, Scan to SMB, PC Fax, TWAIN, SmarThru Office |

FIG. 3B

Detected Printer List

| No | Model Name | Connection | IP Address | Mac Address | IP Assign Method | Status | Detection | Supporting Printer Application Program Program |
|---|---|---|---|---|---|---|---|---|
| 5 | MJC-6750 | "USB002 (168.219.12.252)" | - | 0000F0A01238 | - | Idle | PMP | SETIP, PSU, Print |
| 6 | ML-2850 | Network | "192.0.0192" | 0000F0A01239 | DHCP(Not Configured) | Idle | PMP | SETIP, PSU, Print, Port Status Monitor, Direct Print |
| 7 | CLX-8380 | Network | "192.168.10.126" | 0000F0A01240 | STATIC | Idle | PMP | SETIP, PSU, Print, Port Status Monitor, Direct Print, Scan to Email, NetScan, Scan to FTP, Scan to SMB, PC Fax, TWAIN, SmarThru Office |
| 8 | CLP-700 | Network | "10.88.123.456" | 0000F0A01241 | STATIC | Idle | PMP | SETIP, PSU, Print, Port Status Monitor, Direct Print |
| 9 | CLP-700 | Network | "FE80::215:99FF:FE2C:2454/64" | 0000F0A01242 | IPv6(Link-local Address) | Idle | PMP | SETIP, PSU, Print, Port Status Monitor, Direct Print |
| 10 | ML-5000 | Network | "3FFE:10:88:194:215:99FF:FE2C:2454/64" | 0000F0A01243 | IPv6(DHCPv6 Router) | Idle | PMP | SETIP, PSU, Print, Port Status Monitor, Direct Print |

METHOD OF SEARCHING FOR IMAGE FORMING APPARATUSES BY USING SERVER, AND HOST APPARATUS AND SYSTEM FOR PERFORMING THE METHOD

CROSS-REFERENCE TO RELATED APPLICATION

This application claims the benefit of Korean Application No. 10-2008-0102149, filed in the Korean Intellectual Property Office on Oct. 17, 2008, the disclosure of which is incorporated herein by reference.

BACKGROUND OF THE INVENTION

1. Field of the Invention

Aspects of the present invention relate to a method and apparatus for searching for image forming apparatuses by using a server when a target image forming apparatus needs to be connected to a host apparatus.

2. Description of the Related Art

Image forming apparatuses refer to apparatuses that form images onto a medium. Examples of such image forming apparatuses include, but are not limited to, printers, copiers, scanners, and facsimile machines. Image forming apparatuses may be used by being connected to a host apparatus. In order to connect a target image forming apparatus to be used to a host apparatus, the host apparatus searches for peripheral image forming apparatuses that are connectable to the host apparatus. To this end, the host apparatus installs a printer application program (PAP) for image forming apparatus utilization and management, and searches for peripheral image forming apparatuses using the installed PAP. The host apparatus searches for peripheral image forming apparatuses by using an independent search method corresponding to the installed PAP. However, there is a demand for developing the same independent search method in an image forming apparatus to search for an image forming apparatus using a PAP. Also, there are limitations in searching for various kinds of image forming apparatuses by using one search method. For example, a broadcast search method, which is generally used in a PAP, can search only for image forming apparatuses responding to a broadcast message.

SUMMARY OF THE INVENTION

Aspects of the present invention provide a method and apparatus for searching for various kinds of image forming apparatuses by using a server in order to connect a target image forming apparatus to be used to a host apparatus.

According to an aspect of the present invention, a method of searching for peripheral image forming apparatuses is provided, using a server that has a printer management program for image forming apparatus management installed therein and that is connected to a host apparatus in which one or more printer application programs are installed. The method comprises: selecting a search method in the one or more printer application programs; if a printer management program search method is selected as the search method, invoking the printer management program; receiving from the printer management program a search list of one or more image forming apparatuses which are connectable to the host apparatus; and selecting an image forming apparatus from the search list and connecting the selected image forming apparatus to the host apparatus.

According to another aspect of the present invention, a computer-readable recording medium is provided, having embodied thereon a program to execute the method.

According to another aspect of the present invention, a host apparatus is provided, to search for peripheral image forming apparatuses via a server in which a printer management program for image forming apparatus management is installed. The host apparatus comprises: a storage unit in which one or more printer application programs for image forming apparatus utilization are stored; a selection unit to select a search method in the one or more printer application programs; a transmission/reception unit to invoke, if a printer management program search method is selected by the selection unit, the printer management program and to receive from the printer management program a search list of one or more image forming apparatuses which are connectable to the host apparatus; and an interface unit to connecting an image forming apparatus which is selected from the search list to the host apparatus.

According to another aspect of the present invention, there is provided a system for searching for peripheral image forming apparatuses by using a server, the system comprising: the server having a printer management program for image forming apparatus management installed therein and searching for the peripheral image forming apparatuses by using various search methods of the installed printer management program; a host apparatus connected to the server, having one or more application programs installed therein, and adapted to, if a printer management program search method is selected as a search method in the one or more printer application programs, invoke the printer management program, receive from the printer management program a search list of a plurality of image forming apparatuses which are connectable to the host apparatus, and select an image forming apparatus from the search list; and the image forming apparatus connected to the server, and connected to the host apparatus when being selected by the host apparatus.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 2 illustrates an application program used to select a search method, according to an embodiment of the present invention;

FIGS. 3A and 3B illustrate a list of the image forming apparatuses searched for by the server of FIG. 1, according to an embodiment of the present invention.

DETAILED DESCRIPTION OF THE EMBODIMENTS

Figure 1:
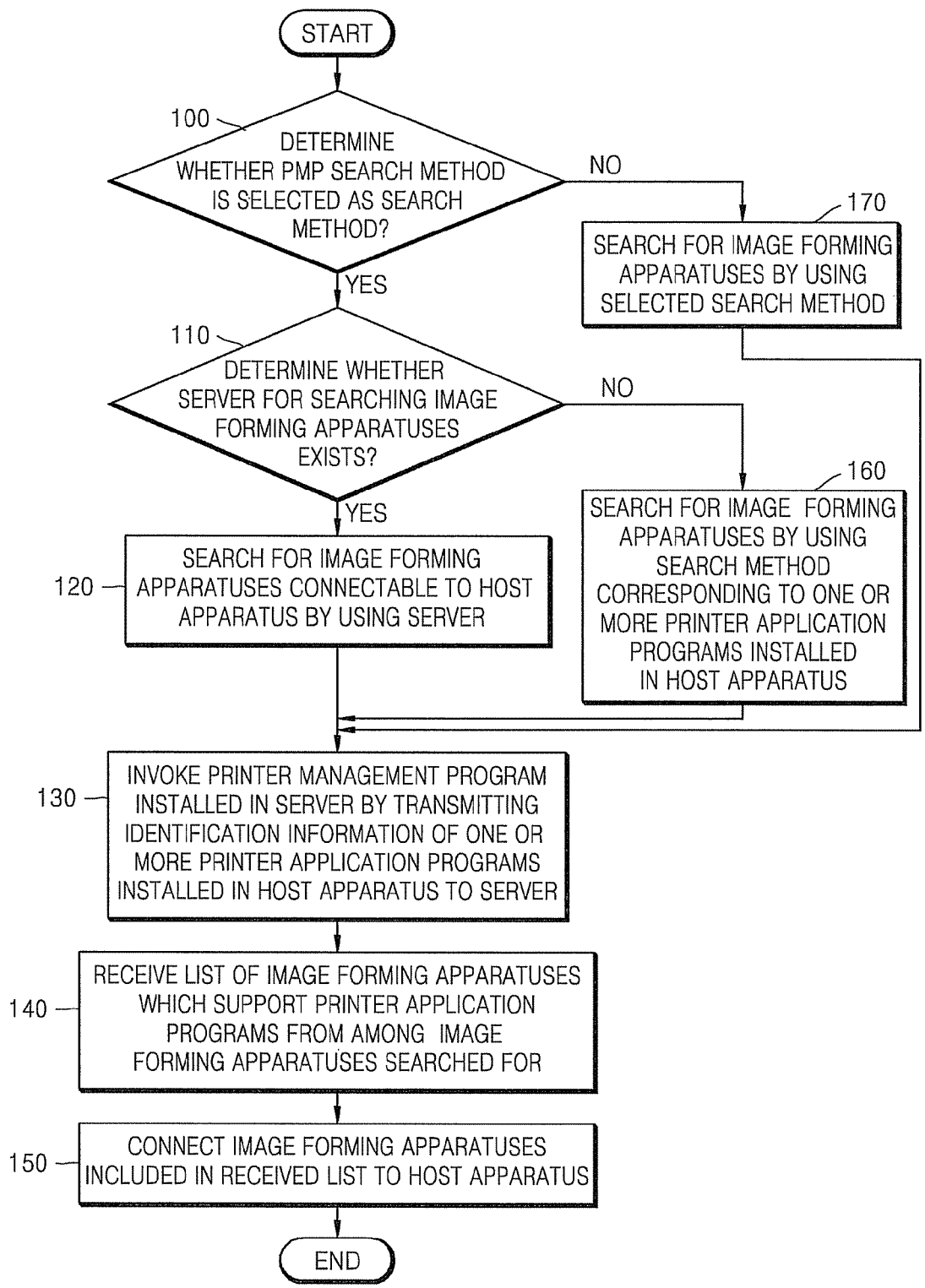
FIG. 1 is a flowchart illustrating a method of searching for image forming apparatuses by using a server, according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

FIG. 1 is a flowchart of a method of searching for image forming apparatuses by using a server, according to an embodiment of the present invention. In operation 100, a search method is selected. A host apparatus in which one or more printer application programs (PAPs) are installed can perform the method of FIG. 1 and select a search method in the PAPs.

FIG. 2 illustrates an application program used to select a search method, according to an embodiment of the present invention. Search methods include, but need not be limited to, a printer management program (PMP) search method 200, a PAP search method 210, and a manual search method 220. Accordingly, in operation 100, any of the PMP search method 200, the PAP search method 210, and the manual search method 220 may be selected. If the PMP search method 200 is selected, the method proceeds to operation 110. If the PAP search method 210 or the manual search method 220 other than the PMP search method 200 is selected, the method proceeds to operation 170. The PMP search method 200 refers to a method of searching for image forming apparatuses by using the server in which a PMP is installed. The PAP search method 210 refers to a method of searching for image forming apparatuses by using the one or more PAPs installed in the host apparatus. The manual search method 220 refers to a method of searching for image forming apparatuses according to a user input, for example, an Internet protocol (IP) address input.

In operation 110, it is determined whether the server for searching for image forming apparatuses exists. The server supports the PMP and may use, for example, service location protocol (SLP) using broadcast and multicast, multicast domain name system (DNS), lightweight directory access protocol (LDAP), IP scanning, simple network management protocol, and a search method using a search list of other PMPs. The host apparatus determines whether the server exists in a network using, for example, a broadcast search method. After the host apparatus broadcasts data for determining whether the server exists, if the host apparatus receives a response within a predetermined period of time, the host apparatus determines that the server for searching for image forming apparatuses exists and the method proceeds to operation 120. If the host apparatus does not receive any response within the predetermined period of time, the host apparatus determines that the server for searching for the image forming apparatuses does not exist and the method proceeds to operation 160.

In operation 120, image forming apparatuses connectable to the host apparatus are searched for using the server. The server may use the SLP using broadcast and multicast, multicast DNS, LDAP, IP scanning, simple network management protocol, local device discover, and a search method using a search list of other PMPs. Peripheral image forming apparatuses, which are located around the host apparatus and are connectable to the host apparatus, may be searched for using one or more of these methods. The server stores information about the image forming apparatuses searched for.

FIGS. 3A and 3B illustrate a list of the image forming apparatuses searched for by the server of FIG. 1, according to an embodiment of the present invention. Referring to FIGS. 3A and 3B, since the server can use various search methods to search for image forming apparatuses, image forming apparatuses can be searched for using methods other than the broadcast search method. Thus, while only image forming apparatuses 1 and 2 can be searched for by using the broadcast search method, which is generally used in a PAP, image forming apparatuses 1 through 10 can be searched for using the server. Also, by using the server, the image forming apparatus 5, which is directly connected through a universal serial bus (USB) port to the host apparatus, not through a network, can be searched for, and the image forming apparatuses with IP assignment methods, such as dynamic host configuration protocol (DHCP), AUTO IP, or static IP addresses, can also be discovered. Also, by using the server, the image forming apparatuses having the IP address 168.219.21.x can be searched for in addition to the image forming apparatuses 1 and 2 with an IP address 168.219.12.x.

Referring to FIG. 1 again, in operation 130, the PMP installed in the server is invoked by transmitting identification information of the one or more PAPs installed in the host apparatus to the server. Various PAPs may be installed in the host apparatus. Examples of such PAPs may include a printer driver transmitting a file to a printer, a printer port status monitor displaying information about the status of a printer and consumables, an IP configuration utility program setting an IP of a printer product, a printer setting utility program setting a printer in a remote manner, and a network scan program performing a network scan. However, the PAPs listed above are just examples of the PAPs; aspects of the present invention are not limited to the above examples. Identification information of the one or more PAPs installed in the host apparatus among the PAPs is transmitted to the server. For example, if a network scan program is installed in the host apparatus, network scan program identification (ID), which is identification information of the network scan program, is transmitted to the server.

In operation 140, a list of the image forming apparatuses that support the transmitted one or more PAPs is received. For example, if the network scan program ID is transmitted to the server, the server determines that the network scan program is installed in the host apparatus. Accordingly, the host apparatus may receive a list of image forming apparatuses which support a network scan. Referring to FIGS. 3A and 3B, since the image forming apparatuses 1, 4, and 7 support a network scan, a list of the image forming apparatuses 1, 4, and 7 may be received.

In operation 150, the image forming apparatuses included in the received list are connected to the host apparatus. For example, if the list of the image forming apparatuses 1, 4, and 7 is received from the server, the image forming apparatuses 1, 4, and 7 are connected to the host apparatus.

The server communicates with the host apparatus by using a module that is shared by the one or more PAPs installed in the host apparatus. The host apparatus may communicate with the image forming apparatuses connected to the host apparatus by using the module. A dynamic link library (DLL) file "CommonPMPClient.Dll" may be used as the module. The module updates and stores PAP information in the server whenever an event occurs in the one or more PAPs installed in the host apparatus. Examples of such an event may include installation and deletion of a PAP, addition of a PAP, a change in a list of deleted devices, and use of a PAP. Examples of updated information may include PAP version information, information about a list of PAP users, and information about a list of registered printer application devices. Information about the one or more PAPs installed in the host apparatus may be received, stored, and updated using the module. In addition, if an IP address of an image forming apparatus connected to the host apparatus or an IP address of the host apparatus is changed, the server transmits the changed IP address to the image forming apparatus and the host apparatus. The host apparatus receiving the changed IP address of the image forming apparatus changes the IP address of the image forming apparatus to the received IP address. Likewise, the image forming apparatus receiving the changed IP address of the host apparatus changes the IP address of the host apparatus to the received IP address. Accordingly, even though the IP address of the host apparatus and the IP address of the image forming apparatus connected to the host apparatus are changed, the host apparatus and the image forming apparatus can still communicate with each other.

In operation 160, image forming apparatuses are searched for using a search method corresponding to the one or more PAPs installed in the host apparatus. For example, the image forming apparatuses may be searched for using a search method corresponding to a general PAP, such as a broadcast search method or a manual search method using an IP address input.

In operation 170, image forming apparatuses are searched for using a selected search method. For example, if the PAP search method 210 of FIG. 2 is selected as the search method, image forming apparatuses are searched for using the PAP search method 210. Similarly, if the manual search method 220 is selected, image forming apparatuses are searched for using the manual search method 220 based on, for example, an IP address input.

Figure 4:
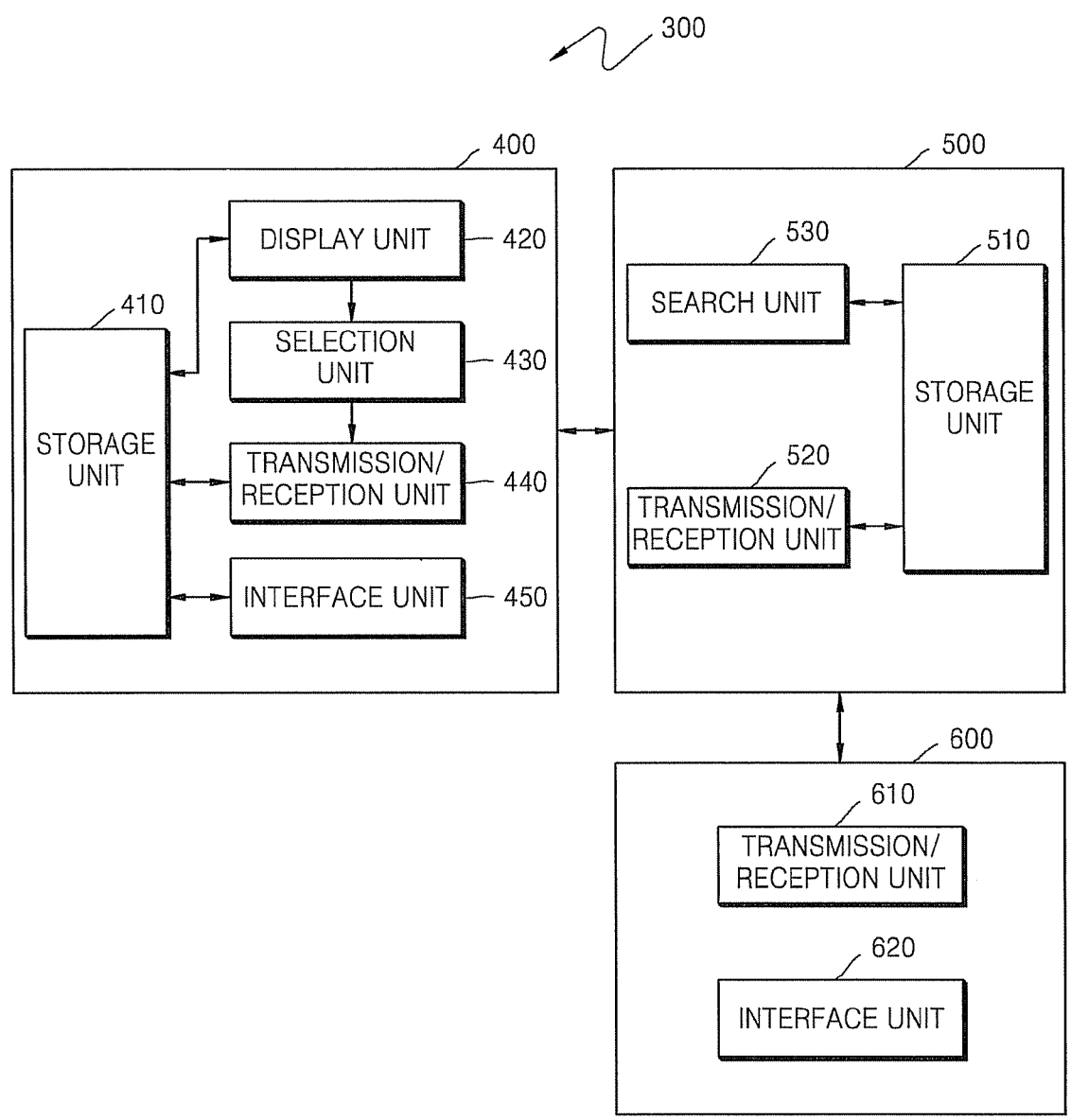
FIG. 4 is a block diagram of a system for searching for image forming apparatuses by using a server, according to an embodiment of the present invention.

FIG. 4 is a block diagram of a system 300 to search for image forming apparatuses by using a server, according to an embodiment of the present invention. Referring to FIG. 4, the system 300 includes a host apparatus 400, a server 500, and an image forming apparatus 600. The host apparatus 400 is connected to the server 500, which is disposed outside the host apparatus 400. The host apparatus 400 searches for the image forming apparatus 600 using the server 500, and communicates with the image forming apparatus 600.

The host apparatus 400 includes a storage unit 410, a display unit 420, a selection unit 430, a transmission/reception unit 440, and an interface unit 450. According to other aspects of the present invention, the host apparatus 400 may include additional and/or different units. Similarly, the functionality of two or more of the above units may be integrated into a single component.

The storage unit 410 stores a PAP for image forming apparatus utilization. For example, the storage unit 410 stores one or more PAPs, such as a printer driver, a printer port status monitor, an IP configuration utility program, a printer setting utility program, and a network scan program.

The display unit 420 displays available search methods, such as a PMP search method, a PAP search method, and a manual search method. The search methods displayed by the display unit 420 are the same as shown in FIG. 2.

The selection unit 430 selects any of the search methods displayed by the display unit 420. If the PMP search method is selected by the selection unit 430, the transmission/reception unit 440 invokes a PMP, and receives a search list of one or more image forming apparatuses which are connectable to the host apparatus from the PMP. The transmission/reception unit 440 receives a list of image forming apparatuses searched for by the server. If the server exists in a network, image forming apparatuses which are located around the host apparatus and can be connected to the host apparatus can be searched for using the server. Accordingly, the transmission/reception unit 440 receives a list, which is obtained from the server after the image forming apparatuses are searched for by various search methods of the server. The transmission/reception unit 440 may transmit identification information of the one or more PAPs stored in the storage unit 410, and receive a list of image forming apparatuses corresponding to the identification information of the PAPs from among the image forming apparatuses searched for by the server.

The interface unit 450 connects image forming apparatuses which support the one or more PAPs stored in the storage unit 410 from among the image forming apparatuses included in the list received from the transmission/reception unit 440. If the transmission/reception unit 440 transmits the identification information of the PAPs and receives a list of the corresponding image forming apparatuses, the interface unit 450 connects the image forming apparatuses included in the received list.

The server 500 includes a storage unit 510, a transmission/reception unit 520, and a search unit 530. The storage unit 510 stores the PMP. The search unit 520 searches for image forming apparatuses using a device search method such as SLP using broadcast and multicast, multicast DNS, LDAP, IP scanning, simple network management protocol, local device discover, and a search method using a search list of other PMPs. The transmission/reception unit 520 transmits a search list to the host apparatus 400.

The image forming apparatus 600 includes a transmission/reception unit 610 and an interface unit 620. If image forming apparatuses are searched for using the server 500 and the image forming apparatus 600 is selected, the transmission/reception unit 610 transmits information of the image forming apparatus 600 to the server 500, and the interface unit 620 connects the image forming apparatus 600 to the host apparatus 400.

Aspects of the present invention may be embodied as a program that can be read by a computer and may be embodied in a general purpose digital computer by running the program from a computer-readable recording medium. Data used in the embodiments of the present invention may be written to the computer-readable recording medium in any fashion. Examples of the computer-readable recording medium include storage, media such as magnetic storage media (e.g., read only memories (ROMs), floppy discs, or hard discs), optically readable media (e.g., compact disk-read only memories (CD-ROMs), or digital versatile disks (DVDs)). Aspects of the present invention may also be embodied in carrier waves (e.g., transmissions over the Internet).

Although a few embodiments of the present invention have been shown and described, it would be appreciated by those skilled in the art that changes may be made in this embodiment without departing from the principles and spirit of the invention, the scope of which is defined in the claims and their equivalents. While the present invention has been particularly shown and described with reference to exemplary embodiments thereof using specific terms, the embodiments and terms have been used to explain the present invention and should not be construed as limiting the scope of the present invention defined by the claims. The preferred embodiments should be considered in a descriptive sense only and not for purposes of limitation. Therefore, the scope of the invention is defined not by the detailed description of the invention but by the appended claims, and all differences within the scope will be construed as being included in the present invention.

What is claimed is:

1. A method of searching for peripheral image forming apparatuses using a server that has a printer management program for image forming apparatus management installed therein and that is connected to a host apparatus in which one or more printer application programs are installed, the method comprising:

selecting a search method in an application program;
when a printer management program search method is
 selected as the search method, determining whether the server exists using a broadcast method;

when it is determined that the server exists,
searching, using the server, for image forming apparatuses that are connectable to the host apparatus;
invoking the printer management program by transmitting identification information of the one or more printer application programs installed in the host apparatus to the server;
receiving from the printer management program a search list of one or more image forming apparatuses which are connectable to the host apparatus; and
selecting an image forming apparatus from the search list and connecting the selected image forming apparatus to the host apparatus, when it is determined that the server does not exist, searching for image forming apparatuses using a search method corresponding to one or more of the printer application programs installed in the host apparatus; and when a printer management program search method is not selected as the search method, searching for image forming apparatuses by using the selected method.

2. The method of claim 1, wherein the selecting of the search method comprises:
displaying a printer management program search method, a printer application program search method, and a manual search method as search methods; and
selecting one or more of the displayed search methods.

3. The method of claim 1, further comprising storing, in the server, information about the one or more printer application programs and the image forming apparatus that is connected to the host apparatus.

4. The method of claim 1, wherein if an Internet protocol (IP) address of the image forming apparatus connected to the host apparatus is changed, the method further comprises:
receiving the changed IP address from the server; and
changing the IP address of the image forming apparatus to the received IP address.

5. The method of claim 1, wherein the server and the host apparatus communicate with each other using at least one module that is shared by the one or more printer application programs installed in the host apparatus.

6. The method of claim 5, wherein the host apparatus communicates with the image forming apparatus connected to the host apparatus via the at least one module.

7. The method of claim 1, further comprising searching for the peripheral image forming apparatuses via the server, based on at least one search method selected from a group comprising service location protocol (SLP) using broadcast and multicast, multicast domain name system (DNS), lightweight directory access protocol (LDAP), IP scanning, simple network management protocol, local device discover, and a search method using a search list of other printer management programs.

8. A host apparatus to search for peripheral image forming apparatuses via a server in which a printer management program for image forming apparatus management is installed, the host apparatus comprising:
a storage storing one or more printer application programs for image forming apparatus utilization;
a selector selecting a search method in an application program;
a transceiver invoking a printer management program by transmitting identification information of the one or more printer application programs installed in the host apparatus to the server, when a printer management program search method is selected by the selector, and receiving from the printer management program a search list of one or more image forming apparatuses which are connectable to the host apparatus, and searching for image forming apparatuses by using the selected method when a printer management program search method is not selected as the search method; and
an interface connecting an image forming apparatus which is selected from the search list to the host apparatus.

9. The host apparatus of claim 8, further comprising a display displaying a printer management program search method, a printer application program search method, and a manual search method as search methods.

10. The host apparatus of claim 8, wherein the server stores information about the one or more printer application programs and the image forming apparatus that is connected to the host apparatus.

11. The host apparatus of claim 8, wherein the server and the host apparatus communicate with each other via at least one module that is shared by the one or more printer application programs installed in the host apparatus.

12. The host apparatus of claim 8, wherein the server searches for the peripheral image forming apparatuses based on at least one search method selected from a group comprising SLP using broadcast and multicast, multicast DNS, LDAP, IP scanning, simple network management protocol, local device discover, and a search method using a search list of other printer management programs.

13. A system for searching for peripheral image forming apparatuses, the system comprising:
a server having a printer management program for image forming apparatus management installed therein, to search for the peripheral image forming apparatuses based on various search methods of the installed printer management program;
a host apparatus connected to the server, having one or more application programs installed therein, and configured to, when a printer management program search method is selected as a search method in an application program, invoke the printer management program by transmitting identification information of the one or more printer application programs installed in the host apparatus to the server, receive from the printer management program a search list of a plurality of image forming apparatuses which are connectable to the host apparatus, and select an image forming apparatus from the search list, and search for image forming apparatuses by using the selected method when a printer management program search method is not selected as the search method; and
an image forming apparatus connected to the server, and connectable to the host apparatus when selected by the host apparatus.

* * * * *